(12) United States Patent
Czerwinka et al.

(10) Patent No.: US 11,702,114 B2
(45) Date of Patent: Jul. 18, 2023

(54) TRIM ASSEMBLY FOR A VEHICLE

(71) Applicant: Siemens Mobility Austria GmbH, Vienna (AT)

(72) Inventors: Thomas Czerwinka, Weitendorf (AT); David Kreuzweger, Lieboch (AT); Christian Moser, Graz (AT); Alexander Prix, Graz (AT); Jochen Ringswirth, Graz (AT)

(73) Assignee: SIEMENS MOBILITY AUSTRIA GMBH, Vienna (AT)

( * ) Notice: Subject to any disclaimer, the term of this patent is extended or adjusted under 35 U.S.C. 154(b) by 353 days.

(21) Appl. No.: 16/955,395

(22) PCT Filed: Dec. 20, 2017

(86) PCT No.: PCT/EP2017/083775
§ 371 (c)(1),
(2) Date: Jun. 18, 2020

(87) PCT Pub. No.: WO2019/120508
PCT Pub. Date: Jun. 27, 2019

(65) Prior Publication Data
US 2020/0346669 A1    Nov. 5, 2020

(51) Int. Cl.
*B61D 17/02* (2006.01)

(52) U.S. Cl.
CPC .................. *B61D 17/02* (2013.01)

(58) Field of Classification Search
CPC .... B61D 17/02; B61D 17/043; B61D 17/045; B61D 17/046; Y02T 30/00; B61F 3/14; B61F 19/02; F16B 35/06
See application file for complete search history.

(56) References Cited

U.S. PATENT DOCUMENTS

| | | | |
|---|---|---|---|
| 5,407,310 A | * | 4/1995 | Kassouni ............... F16B 35/06 411/173 |
| 9,908,538 B2 | | 3/2018 | Kreuzweger et al. |
| 2014/0243791 A1 | | 8/2014 | Sherman et al. |

(Continued)

FOREIGN PATENT DOCUMENTS

| | | |
|---|---|---|
| CN | 105307918 | 2/2016 |
| CN | 105909661 | 8/2016 |

(Continued)

OTHER PUBLICATIONS

Xiaofeng et al. "Structure Optimization Of Apron Safety Chain For 25T Passenger Car," 2016, pp. 11-12.

(Continued)

*Primary Examiner* — Mark T Le
(74) *Attorney, Agent, or Firm* — Cozen O'Connor

(57) ABSTRACT

A trim assembly includes at least one trim part for a vehicle, wherein the at least one trim part has at least one bearing device where, in order to provide advantageous construction conditions, the trim assembly includes at least one first emergency catch device having a first support, the at least one first emergency catch device includes at least one first catch bolt having a contact surface facing the at least one trim part and includes at least one first spacer, and the at least one first catch bolt and the at least one first spacer are connected to the first support so as to ensure the trim assembly is highly resistant to loss.

18 Claims, 2 Drawing Sheets

(56) References Cited

U.S. PATENT DOCUMENTS

2016/0152248 A1* 6/2016 Kreuzweger .......... B61D 17/02
                                                        105/1.1
2017/0274912 A1* 9/2017 Do ........................ B61D 17/02

FOREIGN PATENT DOCUMENTS

| DE | 102009006562 | | 8/2010 |
|----|--------------|---|--------|
| DE | 102013018714 | | 5/2015 |
| FR | 2961468 | | 12/2011 |
| JP | H11189154 | | 7/1999 |
| JP | 2000052981 A | * | 2/2000 |
| JP | 2012006466 A | * | 1/2012 |
| JP | 2013-199135 | | 10/2013 |
| KR | 20090002803 | | 3/2009 |
| WO | 2014206643 | | 12/2014 |

OTHER PUBLICATIONS

Office Action dated Dec. 24, 2020 issued in Chinese Patent Application No. 201780097867.5.
PCT International Search Report dated Sep. 10, 2018 based on PCT/EP2017/083775 filed Dec. 20, 2017.

* cited by examiner

TRIM ASSEMBLY FOR A VEHICLE

CROSS-REFERENCE TO RELATED APPLICATIONS

This is a U.S. national stage of application No. PCT/EP2017/083775 filed 20 Dec. 2017.

BACKGROUND OF THE INVENTION

1. Field of the Invention

The invention relates to a trim assembly comprising at least one trim part for a vehicle, where the trim part has at least one bearing device.

2. Description of the Related Art

To achieve a low air resistance, vehicles, chassis, roofs or roof-mounted structures of vehicles (e.g., rail vehicles, bogies and/or roofs of rail vehicles) often have aerodynamically shaped trims. A low air resistance is particularly important at high running speeds in order to keep the energy requirement or requirement for traction power and/or fuel consumption of the vehicle as low as possible.

WO 2014/206643 A1, for example, describes a trimmed chassis for a rail vehicle. Here, side parts of the trim are arranged on the side of the chassis or along the length of the rail vehicle. A base part is provided on an underside of the chassis. The side parts are connected to a car body of the rail vehicle, while the base part is connected to the chassis. A gap is provided between the side elements and the base element so as to enable wheels to turn outward.

DE 10 2009 006 562 A1 also describes a trim for a chassis of a rail vehicle or a rail vehicle with a trimmed chassis. The trim comprises a wall surrounding the chassis and a base. The base is connected to the chassis with fastening means.

In their conventional forms, the specified approaches have the disadvantage that no redundancies or specific catch devices to prevent the loss of the trim are disclosed.

SUMMARY OF THE INVENTION

In view of the foregoing, it is therefore an object of the invention to provide a trim assembly that is more advanced in comparison to the prior art trim assemblies.

This and other objects and advantages are achieved in accordance with the invention by a trim assembly, in which at least one first emergency catch device having a first support is provided, in which the at least first emergency catch device has at least one first catch bolt having a contact surface facing toward the at least one trim part and at least one first spacer, and in which the at least first catch bolt and the at least first spacer are connected to the first support.

On account of the emergency catch device, a redundancy is achieved with respect to the bearing device, thus ensuring that the trim assembly is highly resistant to loss. Furthermore, the first catch bolt and the first spacer or their specific embodiments and arrangements enable an easy mounting and dismantling of the trim part. A reduction of the servicing and maintenance costs is thereby achieved.

The first support acts as a bearing for the first catch bolt and the first spacer, i.e., the first catch bolt and the first spacer are connected not directly to the trim part but, instead, to the first support. A high stability of the emergency catch device is thereby achieved. In addition to its function as a bearing for the first catch bolt and the first spacer, the first support can act as a receptacle for further components.

It is favorable if the at least one trim part has at least one first flap. With this measure, an easy accessibility of components connected to the vehicle behind the trim part is achieved for servicing and maintenance purposes.

An advantageous solution is achieved if the at least first flap is rotatably mounted about a first axis running parallel to a chassis longitudinal axis of the vehicle. With this measure, the first flap is prevented from posing an obstacle, in its opened state, to the ability of persons or vehicles to access a maintenance pit running below a track in the longitudinal track direction, because during the foregoing state the first flap is aligned longitudinally with the maintenance pit or protrudes downward at the side.

A favorable solution is achieved if the at least first emergency catch device is formed so that it can be coupled to the at least one trim part via at least one first closure arranged on the at least one trim part. With this measure, it is achieved that the first emergency catch device, in addition to its retaining function, also performs a locking function, which enables the first flap and/or the trim part to be easily unlocked and opened or detached from the rail vehicle as well as closed or connected to the rail vehicle and locked.

Furthermore, it is favorable if the at least first closure has a first lock catch. Here, it is also advantageous if the at least first support has at least one closure cut-out. With these measures, it becomes possible to lock or unlock the first flap and/or the trim part via a snap closure in a similar manner to a door leaf of a building door. For locking purposes, the first flap and/or the trim part must simply be closed and the first lock catch must latch into the closure cut-out. In this way, an easy locking of the first flap and/or of the trim part is achieved, which can also be performed from a maintenance pit.

An advantageous solution is achieved if the at least one trim part has an opening in the region of the at least first closure. With this measure, an easy accessibility of the first closure is achieved. To open the first closure or to unlock the first flap and/or the trim part, a tool or a key must simply be introduced into the opening and the first lock catch or a locking stud of a bolt lock actuated. In this way, an easy unlocking of the first flap and/or of the trim part is achieved, which can also be performed from a maintenance pit.

It is favorable if the at least first spacer is embodied as an elastic buffer. With this measure, a vibrational isolation of the trim assembly from the vehicle or a damping effect is achieved, thus avoiding damage to the trim assembly on account of forces and moments transmitted from the vehicle to the trim assembly.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in further detail below with reference to exemplary embodiments, in which.

DETAILED DESCRIPTION OF THE EXEMPLARY EMBODIMENTS

Figure 1:
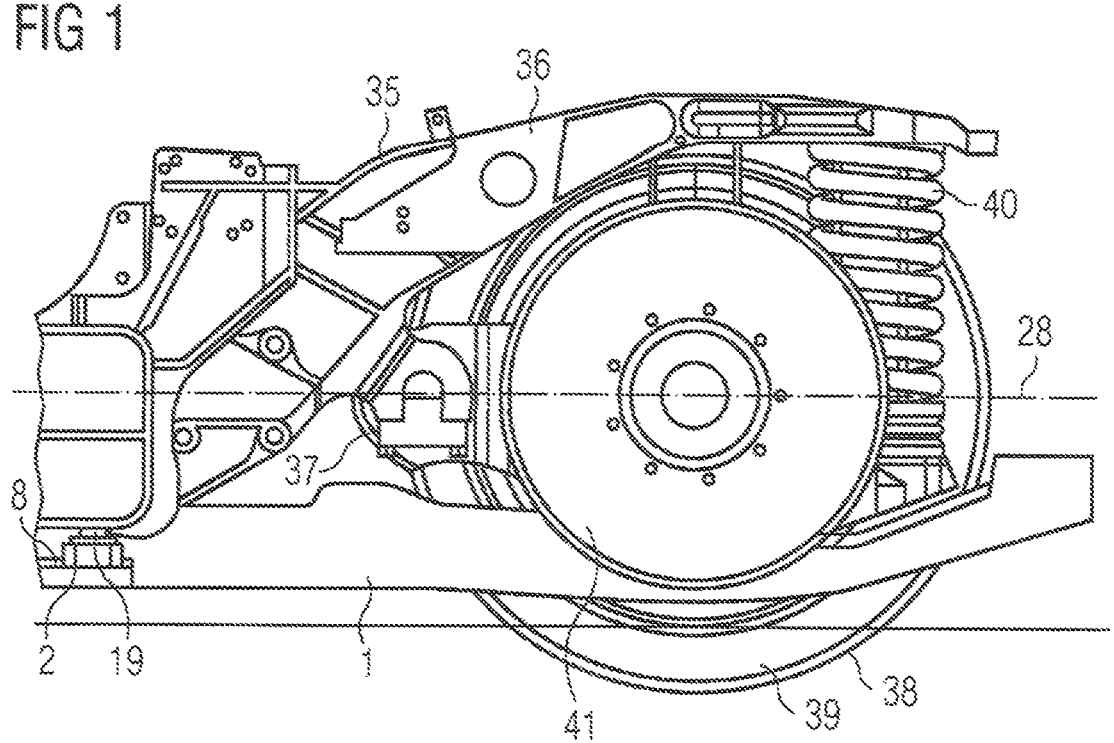
FIG. 1: shows a side view of a section of a chassis of a rail vehicle with a first exemplary embodiment of a trim assembly having a first emergency catch device in accordance with the invention.

A section of a chassis 35 of a rail vehicle, shown in FIG. 1 in a side view, has a chassis frame 36 and a first wheelset 38 with a first wheel 39 and with a second wheel (not visible in FIG. 1). A first wheelset bearing device 37 and a second wheelset bearing device (not visible in FIG. 1) as well as a first primary spring 40 and a second primary spring (not visible) are provided between the chassis frame 36 and the first wheelset 38. A first drive unit 41 is connected to the first wheelset 38.

The chassis 35 has a second wheelset (not shown), which is formed in the same manner as the first wheelset 38 with respect to its configuration and functional properties. The second wheelset is coupled to the chassis frame 36 via a third wheelset bearing device and a fourth wheelset bearing device as well as a third primary spring and a fourth primary spring (also not shown). A second drive unit (not shown) is connected to the second wheelset.

The chassis 35 has a first exemplary embodiment of a trim assembly in accordance with the invention with a trim part 1. The trim part 1 is arranged on an underside of the chassis 35, aligned approximately parallel to a chassis longitudinal axis 28 and shaped aerodynamically.

In accordance with the invention, it is also conceivable for the trim assembly to comprise several elements. For example, side elements for trimming chassis side parts can also be provided in addition to a base element.

Furthermore, it is conceivable for the trim assembly to be arranged not or not only below the chassis 35 but also for example below a car body (not shown) of the rail vehicle.

The trim part 1 is coupled to the chassis 35 via bearing devices (not shown). A first emergency catch device 2, which has a first support 8, a first catch bolt 11 (not shown in FIG. 1) with a contact surface 18 and a first spacer 19, is connected to the trim part 1. The first catch bolt 11 and the first spacer 19 are screwed to the first support 8.

The contact surface 18 of the first catch bolt 11 faces toward the trim part 1. The first catch bolt 11 protrudes into a cut-out of an underside of the chassis frame 36. A profile section of the chassis frame 36 is arranged between the contact surface 18 and the first spacer 19. If the bearing device fails or if it is detached during a dismantling process of the trim part 1, then the trim part 1 is attached to the chassis frame 36 via the first catch bolt 11 of the first emergency catch device 2 or the contact surface 18 thereof. The trim part 1 is thus prevented from falling down.

Figure 2:
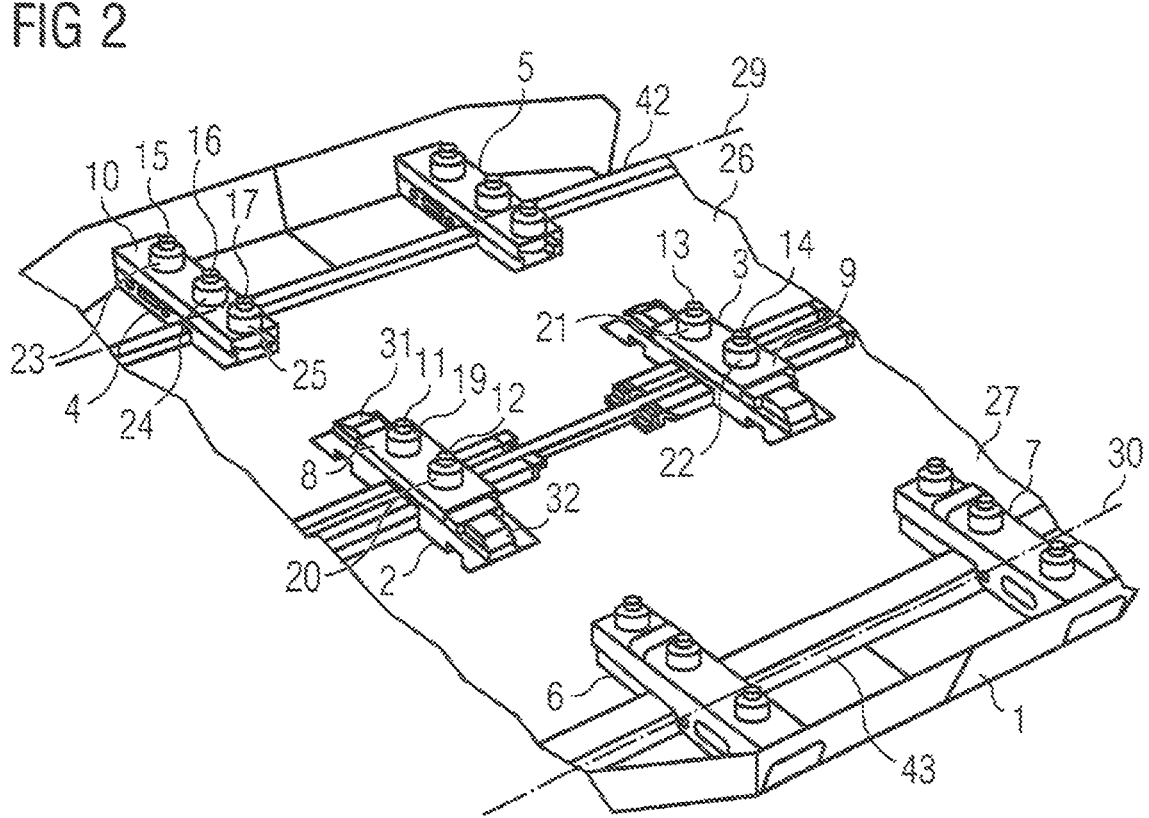
FIG. 2: shows a second exemplary embodiment of a trim assembly in accordance with the invention with a trim part having a first flap and a second flap and with a first emergency catch device and further emergency catch devices.
Figure 3:
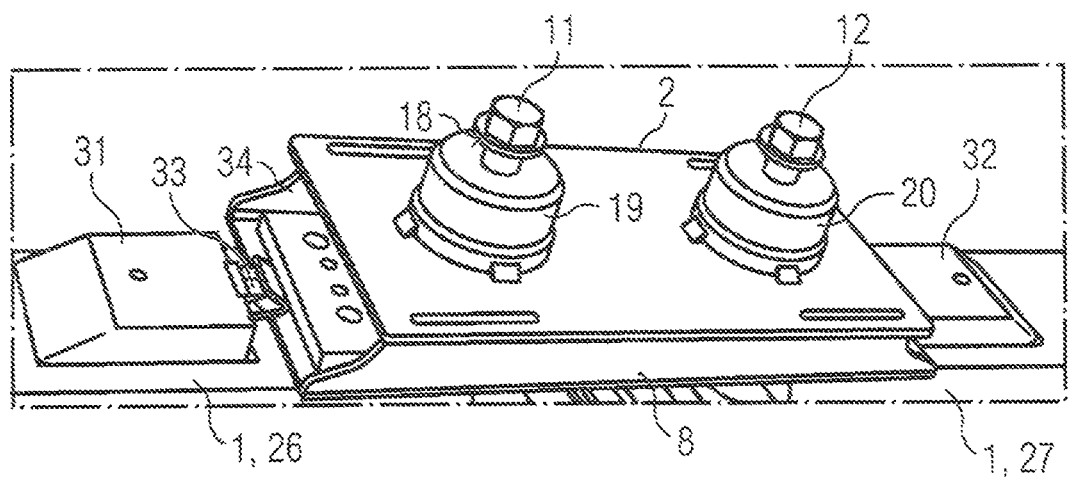
FIG. 3: shows a detailed view of the second exemplary embodiment of a trim assembly in accordance with the invention having a first emergency catch device as well as a first closure and a second closure.

If the trim part 1 is to be detached from the chassis 35, a first closure 31 and a second closure 32, which are shown in FIG. 2 and FIG. 3, must be unlocked and thus the trim part 1 detached from the first emergency catch device 2.

To mount the trim part 1, this is first connected to the first emergency catch device 2 and locked via the first closure 31 and the second closure 32. The trim part 1 is thus initially attached to the chassis 35 via the contact surface 18 of the first catch bolt 11 and the profile section of the chassis frame 36. The bearing device of the trim assembly is then locked to the chassis 35, as a result of which the load is removed from the first emergency catch device 2 or the first catch bolt 11 and the trim part 1 is attached to the chassis 35 via the bearing device.

FIG. 2 discloses a second exemplary embodiment of a trim assembly in accordance with the invention with a trim part 1, which has a first flap 26 and a second flap 27.

As described in connection with FIG. 1, the trim part 1 is connected to a chassis 35 (not shown in FIG. 2) of a rail vehicle by means of a bearing device (not shown).

The trim assembly further has a first emergency catch device 2, a second emergency catch device 3, a third emergency catch device 4, a fourth emergency catch device 5, a fifth emergency catch device 6 and a sixth emergency catch device 7. A first catch bolt 11 and a second catch bolt 12 as well as a first spacer 19 and a second spacer 20 are screwed to a first support 8 of the first emergency catch device 2, a third catch bolt 13 and a fourth catch bolt 14 as well as a third spacer 21 and a fourth spacer 22 are screwed to a second support 9 of the second emergency catch device 3, and a fifth catch bolt 15, a sixth catch bolt 16 and a seventh catch bolt 17 as well as a fifth spacer 23, a sixth spacer 24 and a seventh spacer 25 are screwed to a third support 10 of the third emergency catch device 4.

The fourth emergency catch device 5, the fifth emergency catch device 6 and the sixth emergency catch device 7 are configured in the same manner as the third emergency catch device 4 with respect to their design and functional properties, and correspondingly have further supports, further catch bolts and further spacers.

A profile section of a console (not shown), which is connected to a chassis frame 36 (not shown in FIG. 2) of the chassis 35, is arranged between the first catch bolt 11, the second catch bolt 12, the third catch bolt 13, the fourth catch bolt 14, the fifth catch bolt 15, the sixth catch bolt 16, the seventh catch bolt 17 and the further catch bolts, on the one hand, and between the first spacer 19, the second spacer 20, the third spacer 21, the fourth spacer 22, the fifth spacer 23, the sixth spacer 24, the seventh spacer 25 and the further spacers, on the other hand.

If the bearing device fails (for example, as a result of a breakage) or if the bearing device is detached for the purpose of dismantling the trim part 1, then the trim part 1 is attached, as also described in connection with FIG. 1 in relation to a first exemplary embodiment of a trim assembly in accordance with the invention, to the chassis frame 36 via the first catch bolt 11, the second catch bolt 12, the third catch bolt 13, the fourth catch bolt 14, the fifth catch bolt 15, the sixth catch bolt 16, the seventh catch bolt 17 and via the further catch bolts, and is protected against falling down.

The first support 8 of the first emergency catch device 2 is coupled to the trim part 1 via a first closure 31 and a second closure 32, which are described in detail in connection with FIG. 3.

The first support 8 is coupled to the first flap 26 via the first closure 31 and to the second flap 27 via the second closure 32.

The second support 9 is coupled to further closures, which are embodied in the same manner as the first closure 31 and the second closure 32 with respect to their configuration and functional properties.

The first support 8 and the second support 9 thus also have a closure function with respect to the first flap 26 and the second flap 27 in addition to their support function for the first catch bolt 11, the second catch bolt 12, the third catch bolt 13 and the fourth catch bolt 14 as well as the first spacer 19, the second spacer 20, the third spacer 21 and the fourth spacer 22.

If the first closure 31, the second closure 32 and the further closures, as described in connection with FIG. 1 and FIG. 3, are opened, then the first flap 26 and the second flap 27 open out in a downward direction and chassis components which are arranged above the trim assembly become accessible. It is of course also possible to open either only the first flap 26 or only the second flap 27. The first flap 26 is mounted on the trim part 1 rotatably with respect to a first axis 29 via a first hinge 42 and the second flap 27 with respect to a second axis 30 via a second hinge 43. In an opened state of the first flap 26 or the second flap 27, where the flap protrudes in a downward direction on the side of the chassis 35, because the first axis 29 and the second axis 30 are aligned parallel to a chassis longitudinal axis 28 shown in FIG. 1.

If the rail vehicle is disposed on a track above a maintenance pit, which are not shown, then the maintenance pit is also accessible by persons or vehicles when the first flap 26 or the second flap 27 is open, i.e., the maintenance pit is not obstructed or blocked by the first flap 26 or the second flap 27.

The trim part 1 comprises the first flap 26 and the second flap 27, wherein this is a favorable solution. IN accordance with the invention, it is however also conceivable to provide only the first flap 26 or more flaps than the first flap 26 and the second flap 27.

If only the first flap 26 is arranged, then the first support 8 and the second support 9 are connected in a fixed manner to that region of the trim part 1 which is not embodied to be openable.

In non-openable regions of the trim part 1, the third support 10 and the further supports are connected or welded in a fixed manner to the trim part 1 and accordingly have no closure function.

Seals (not shown) are provided in regions of the first hinge 42 and the second hinge 43 as well as between the first flap 26 and the second flap 27, via which seals vehicle components arranged above the trim assembly are protected against environmental influences, such as rain, snow, moisture and/or particles, when the first flap 26 and the second flap 27 are closed.

FIG. 3 shows a detail of the second exemplary embodiment shown in FIG. 2 of a trim assembly of a vehicle in accordance with the invention with a trim part 1, a first emergency catch device 2 as well as a first closure 31 and a second closure 32.

The first emergency catch device 2 has a first support 8, to which a first catch bolt 11 and a first spacer 19 as well as a second catch bolt 12 and a second spacer 20 are screwed. The first spacer 19 and the second spacer 20 are formed as cylindrical elastic buffers. The trim assembly is thereby advantageously isolated mechanically or vibrationally from the vehicle or from vehicle components to which the trim part 1 is connected, thus avoiding damage. The first spacer 19 is arranged around the first catch bolt 11, the second spacer 20 around the second catch bolt 12.

The first catch bolt 11 has a bolt head, which comprises a contact surface 18 on a side facing toward the first support 8 or the trim part 1, the function of which contact surface is described in connection with FIG. 1. The second catch bolt 12 is formed in the same manner as the first catch bolt 11 with respect to its configuration and functional properties. A profile section of a chassis frame 36 shown in FIG. 1 is arranged between the first catch bolt 11 and the first spacer 19, on the one hand, and between the second catch bolt 12 and the second spacer 20, on the other hand, as a result of which the trim part 1 and the first emergency catch 2 are secured against inadvertent detachment or falling down. If a bearing device (not shown) arranged between a chassis 35 shown in FIG. 1 and the trim part 1 fails or is detached, then the trim part 1 is attached to the chassis frame 36 via the first emergency catch device 2 or the first catch bolt 11 and the second catch bolt 12.

The first support 8 is coupled to the trim part 1 via the first closure 31 and the second closure 32. The trim part 1 has a first flap 26 and a second flap 27, the function of which is described in connection with FIG. 2.

The first closure 31 is arranged on the first flap 26, the second closure 32 on the second flap 27. The first closure 31 has a first lock catch 33 and the second closure 32 has a second lock catch (not visible in FIG. 3).

The first lock catch 33 and the second lock catch are latched into a closure cut-out 34 of the first support 8. The first closure 31 and the second closure 32 are thus locked. With respect to its function, the closure cut-out 34 is configured in a similar manner to a strike plate of a door leaf of a building door.

To unlock or open the first flap 26, a tool or a key is introduced into a first cut-out or opening (not shown), which is provided in the region of the first closure 31 on a side of the first flap 26 facing away from the first support 8, and the first closure 31 or the first lock catch 33 is actuated such that it slides out of the closure cut-out 34 and releases the first flap 26. The first closure 31 is thus separated from the first support 8 and the first flap 26 can be opened.

To unlock or open the second flap 27, the tool or the key is introduced into a second cut-out or opening (not shown), which is provided in the region of the second closure 32 on a side of the second flap 27 facing away from the first support 8, and the second closure 32 or the second lock catch 33 is actuated such that it slides out of the closure cut-out 34 and releases the second flap 27. The second closure 32 is thus separated from the first support 8 and the second flap 27 can be opened.

To lock the first flap 26 or the second flap 27, the first flap 26 or the second flap 27 is closed, as a result of which the first lock catch 33 or the second lock catch automatically latches into the closure cut-out 34 of the first support 8, because the first lock catch 33 is spring-mounted in the first closure 31 and the second lock catch is spring-mounted in the second closure 32.

Following the latching of the first lock catch 33 into the first closure 31 or of the second lock catch into the second closure 32, the first flap 26 or the second flap 27 is locked.

In accordance with the disclosed embodiments of the invention, it is also conceivable to provide a bolt lock with a first locking stud and a second locking stud instead of the first lock catch 33 or the second lock catch. The first locking stud is mounted in the first closure 31, the second locking stud in the second closure 32. The first locking stud and the second locking stud can latch into the closure cut-out 34 of the first support 8 for the purpose of locking the first flap 26 or the second flap 27.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A trim assembly comprising:
   at least one trim part for a vehicle, said at least one trim part including at least one bearing device; and
   at least one first emergency catch device including a first support, said at least one first emergency catch device including at least one first catch bolt with a contact surface facing toward the at least one trim part and at least one first spacer;
   wherein the at least one first catch bolt and the at least first spacer are connected to the first support, and the at least one bearing device is configured to lock the at least one trim part to a vehicle chassis whereby withdrawal of the at least one first catch bolt from supporting said at least one trim part occurs.

2. The trim assembly as claimed in claim 1, wherein the at least one trim part includes at least one first flap.

3. The trim assembly as claimed in claim 2, wherein the at least first flap is rotatably mounted about a first axis extending parallel to a chassis longitudinal axis of the vehicle.

4. The trim assembly as claimed in claim 1, wherein the at least first emergency catch device is connected to the at least one trim part.

5. The trim assembly as claimed in claim 2, wherein the at least first emergency catch device is connected to the at least one trim part.

6. The trim assembly as claimed in claim 3, wherein the at least first emergency catch device is connected to the at least one trim part.

7. The trim assembly as claimed in claim 1, wherein the at least first emergency catch device is configured for coupling to the at least one trim part via at least one first closure arranged on the at least one trim part.

8. The trim assembly as claimed in claim 2, wherein the at least first emergency catch device is configured for coupling to the at least one trim part via at least one first closure arranged on the at least one trim part.

9. The trim assembly as claimed in claim 3, wherein the at least first emergency catch device is configured for coupling to the at least one trim part via at least one first closure arranged on the at least one trim part.

10. The trim assembly as claimed in claim 7, wherein the at least one first closure includes a first lock catch.

11. The trim assembly as claimed in claim 7, wherein the at least one first closure is formed as a bolt lock with a locking stud.

12. The trim assembly as claimed in claim 7, wherein the first support includes at least one closure cut-out.

13. The trim assembly as claimed in claim 10, wherein the first support includes at least one closure cut-out.

14. The trim assembly as claimed in claim 11, wherein the first support includes at least one closure cut-out.

15. The trim assembly as claimed in claim 7, wherein the at least one trim part includes an opening in a region of the at least one first closure.

16. The trim assembly as claimed in claim 1, wherein that the at least one first spacer is formed as an elastic buffer.

17. The trim assembly as claimed in claim 1, wherein the at least one trim part is connected to a chassis of the vehicle via the at least one bearing device.

18. The trim assembly as claimed in claim 1, wherein the at least one trim part is connected to the chassis of the vehicle via the at least first emergency catch device.

* * * * *